United States Patent [19]

Bruzzone et al.

[11] Patent Number: 5,112,583
[45] Date of Patent: May 12, 1992

[54] PROCESS FOR RECOVERING CHROMIC ANHYDRIDE FROM EXHAUSTED AQUEOUS CHROMIUM PLATING BATH SOLUTIONS WITH EXPLOITATION OF THE RECOVERED CHROMIUM

[75] Inventors: Giuseppe Bruzzone, Varazze; Giovanni Ghelli, Savona; Diego Perrone, Cogoleto, all of Italy

[73] Assignee: Luigi Stoppani S.p.A., Milan, Italy

[21] Appl. No.: 573,019

[22] PCT Filed: May 24, 1988

[86] PCT No.: PCT/IT88/00038
§ 371 Date: Nov. 7, 1990
§ 102(e) Date: Nov. 7, 1990

[87] PCT Pub. No.: WO89/09188
PCT Pub. Date: Oct. 5, 1989

[30] Foreign Application Priority Data
Mar. 23, 1988 [IT] Italy ................ 19916A/88

[51] Int. Cl.$^5$ ............... C01G 37/14; C25B 1/16; C02F 1/46
[52] U.S. Cl. ........................... 423/55; 423/62; 423/104; 423/111; 423/138; 204/152; 204/89
[58] Field of Search ............... 204/DIG. 13, 152, 89; 423/42-43, 55, 122, 140, 606, 62, 111, 138

[56] References Cited

U.S. PATENT DOCUMENTS

| | | | |
|---|---|---|---|
| 4,045,340 | 8/1977 | Perrone | 423/55 X |
| 4,108,596 | 8/1978 | Hemming et al. | 423/43 X |
| 4,318,788 | 3/1982 | Duffy | 204/149 |

FOREIGN PATENT DOCUMENTS

| | | |
|---|---|---|
| 551624 | 9/1921 | France. |
| 56-32329 | 6/1981 | Japan. |
| 148615 | 7/1920 | United Kingdom. |

Primary Examiner—Donald R. Valentine
Attorney, Agent, or Firm—Fleit, Jacobson, Cohn, Price, Holman & Stern

[57] ABSTRACT

The chromic anhydride contained in soluble form (chromic acid) in exhausted, polluted chromium plating baths is recovered by alkalizing the exhausted chromium plating liquid to a pH comprised between 3 and 7 at a temperature of 70° C. with a commercial sodium hydroxide solution, keeping the mass in reaction at this temperature for an hour and filtration separating the precipitate obtained. The filtered solution having a specific gravity of 1.25 kg/l, contains $CrO_3$ (22% in weight) which is then reduced with sulphur dioxide to obtain a solution containing basic chromium sulphate and sodium sulphate, suitable for use as a tanning bath; in this manner pollution is avoided and the waste chromium is exploited. The solution containing $CrO_3$ can also be introduced into a hexavalent chromium salt production cycle.

6 Claims, 2 Drawing Sheets

PROCESS FOR RECOVERING CHROMIC ANHYDRIDE FROM EXHAUSTED AQUEOUS CHROMIUM PLATING BATH SOLUTIONS WITH EXPLOITATION OF THE RECOVERED CHROMIUM

The subject of the present invention is a process for recovering chromium anhydride contained in soluble form (chromic acid) in exhausted chromium plating baths polluted by the presence of various metallic ions, particularly iron, copper, zinc, aluminium, nickel, cadmium, as well as by the appearance of trivalent chromium, which forms during chromium plating.

What is meant by exhausted solution is a chromium plating bath that can no longer be used for this purpose because it is polluted with metal ions (essentially iron, copper, zinc, aluminium, nickel, cadmium) and by the appearance of trivalent chronium. A typical example of a so-called exhausted chromium plating bath has the following composition:

| | | |
|---|---|---|
| $CrO_3$ (total) = | 35% | (weight/weight) |
| $CrO_3$ (hexavalent) = | 30% | (weight/weight) |
| $CrO_3$ (trivalent) = | 5% | (weight/weight) |
| Fe = | 30 | parts per 1000 parts of total $CrO_3$ |
| Cu = | 30 | parts per 1000 parts of total $CrO_3$ |
| Zn = | 5 | parts per 1000 parts of total $CrO_3$ |
| Al = | 1 | part per 1000 parts of total $CrO_3$ |
| Ni = | 0.1 | parts per 1000 parts of total $CrO_3$ |
| V = | 0.05 | parts per 1000 parts of total $CrO_3$ |
| Cd = | 0.2 | parts per 1000 parts of total $CrO_3$ |

Depending on the chromium plating processes from which the baths come, the following may also be present: Ca, Mg, Si, Na, $SO_4$, $Cl^-$. There may also be present chinonic organic substances whose disruptive action may easily be stopped by adding mercaptoacetic acid to the chromium sulphate obtained (as described in Italian patent application No. 21807 A/82).

A known method is that of precipitating metallic hydrates contained in aqueous solutions, at controlled pH values, and separating them on the basis of their relative separation factors, see Chemical Economy and Engineering Review; May 1975, vol. 7 No. 5 (No. 84) and references.

Another known method is that of extracting chromic anhydride from aqueous solutions where it is found together with polluting metallic ions, by means of ion exchange resins in solid or liquid form and with appropriate solvents (French patent application No. 2,179,649). Also known is the method (U.S. Pat. No. 4,045,340) consisting of precipitating the internal salt of hexavalent and trivalent chromium, known as chromium chromate, in the cycle of sodium bisulphate recovery from a chromium anhydride synthesis plant.

Now it has surprisingly been discovered that at certain pH values it is possible to precipate simultaneously metallic ions (which pollute an exhausted chromium plating bath) and chromium chromate, which is, as mentioned earlier, an internal salt of hexavalent chromium and trivalent chromium, which are present in the bath.

To be precise, it has been found in particular that the liquids separated by percolation from the chromium chromate precipitate, are suitable for use in a hexavalent chromium salt manufacturing process or to be transformed, by reduction of hexavalent and trivalent chroumium with sulphur dioxide, into a basic chromium sulphate suitable for use in tanning hides, as will be described in greater detail further on, on the basis of illustrative examples.

With this transformation, materials which, being toxic and harmful, would cause serious ecological problems if they were released into the environment, are recovered in the form of products of considerable economic and commerical value, with a much reduced effect on the environmental preservation.

In fact disposal problems are reduced to about 10% and the process claimed herein therefore proves generally more economical.

DETAILED DESCRIPTION OF THE INVENTION

During the studies leading to this discovery, basic chromium sulphate in a residual liquid from chromium plating baths polluted with Fe, Cu, Ni, Al, Zn, V and trivalent chromium was at first transformed directly, reducing the chronium anhydride with sodium bisulphite.

However it was noted that the resulting liquid, used as a tanning bath, gave unsatisfactory results for this operation; it was therefore deduced that a preliminary operation was needed to purify the exhausted, polluted chromium plating bath.

Figure 1:
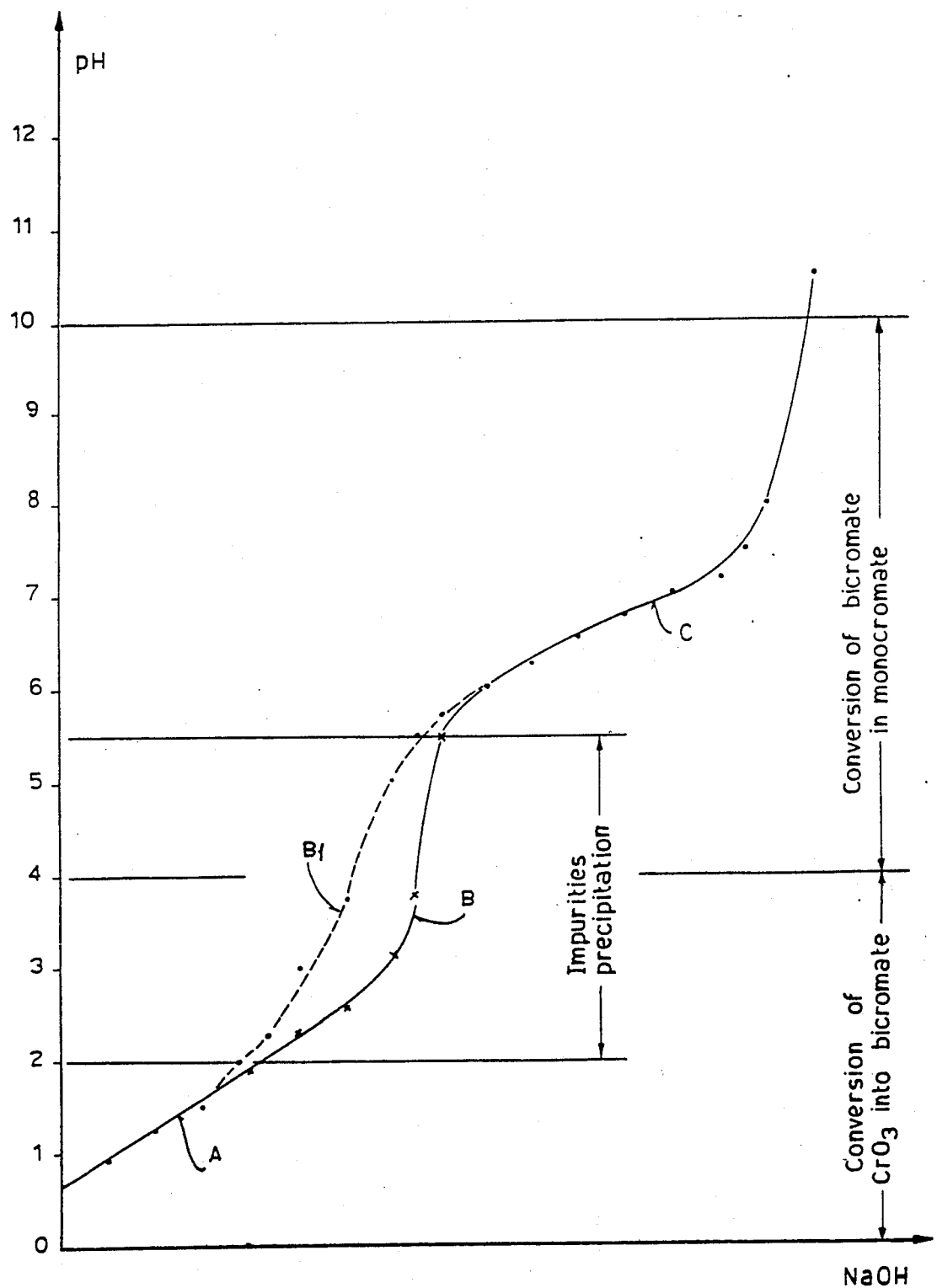
FIG. 1 graphically compares the relative curves of the titration at room temperature of a typical chromium plating bath with NaOH and the same titration carried out on a synthetically obtained solution, with only chromic anhydride dissolved in water, at the same concentration and temperature.

To this end a typical chromium plating bath as described above was titred at room temperature with NaOH and the relative curve (pH vs cc of N/10 NaOH used) was plotted (see FIG. 1) compared with the same titration (and relative curve) carried out on a synthetically obtained solution, with only chromic anhydride dissolved in water, at the same concentration.

An anomaly was observed in the titration curve between the pH values (experimental and theoretical) from 2 to 5.5. In fact in the chromium plating bath at pH 2 solid precipitation began and the pH value subsequently rose more rapidly (up to a value of 5.5) in contrast with what happened in the synthetic solution.

From pH 5.5 to 10 (which is the point at which bichromate is completely transformed to monochromate) behavior was the same in both cases.

The above is schematized in the attached graph (FIG. 1), from which it can be noted that in both cases the following reaction takes place along line A:

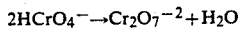

whereas along B (synthetic solution) the previous reaction continues and along $B_1$ (chromium plating bath) the hydrate precipitation reactions combine and predominantly the reaction:

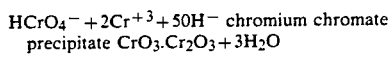

which essentially determines the anomaly shown by curve $B_1$ compared with B. At a pH above 5.5 the following reaction along line C takes place in both cases:

$$Cr_2O_7^{-2} + 2OH^- \rightarrow 2CrO_4^{-2} + H_2O$$

until completion (at pH 10) of the transformation to monochromate.

It was thus discovered that by alkalizing the residual liquid from chromium plating baths, polluted with Fe, Cu, Ni, Al, Zn, V, Cd and $Cr^{III}$, with sodium hydroxide added in such an amount as to bring the pH value to between 3 and 7, all metallic pollutants, present precipitate: surprisingly, by subsequently filtering and subjecting the filtrate (containing $Cr^{VI}$) to the action of $SO_2$, a liquid is obtained containing basic chromium sulphate and sodium sulphate, which has proved suitable, without further modification, for use in tanning baths with excellent results.

The operation described above was repeated several times, filtering the liquids brought to pH values between 3 and 7, and chromium sulphates suitable for hide tanning were always obtained, even though they presented different basicity values (ratio between $SO_3$ linked to the chromium and chromium itself) according to the pH value selected for precipitation.

Figure 2:
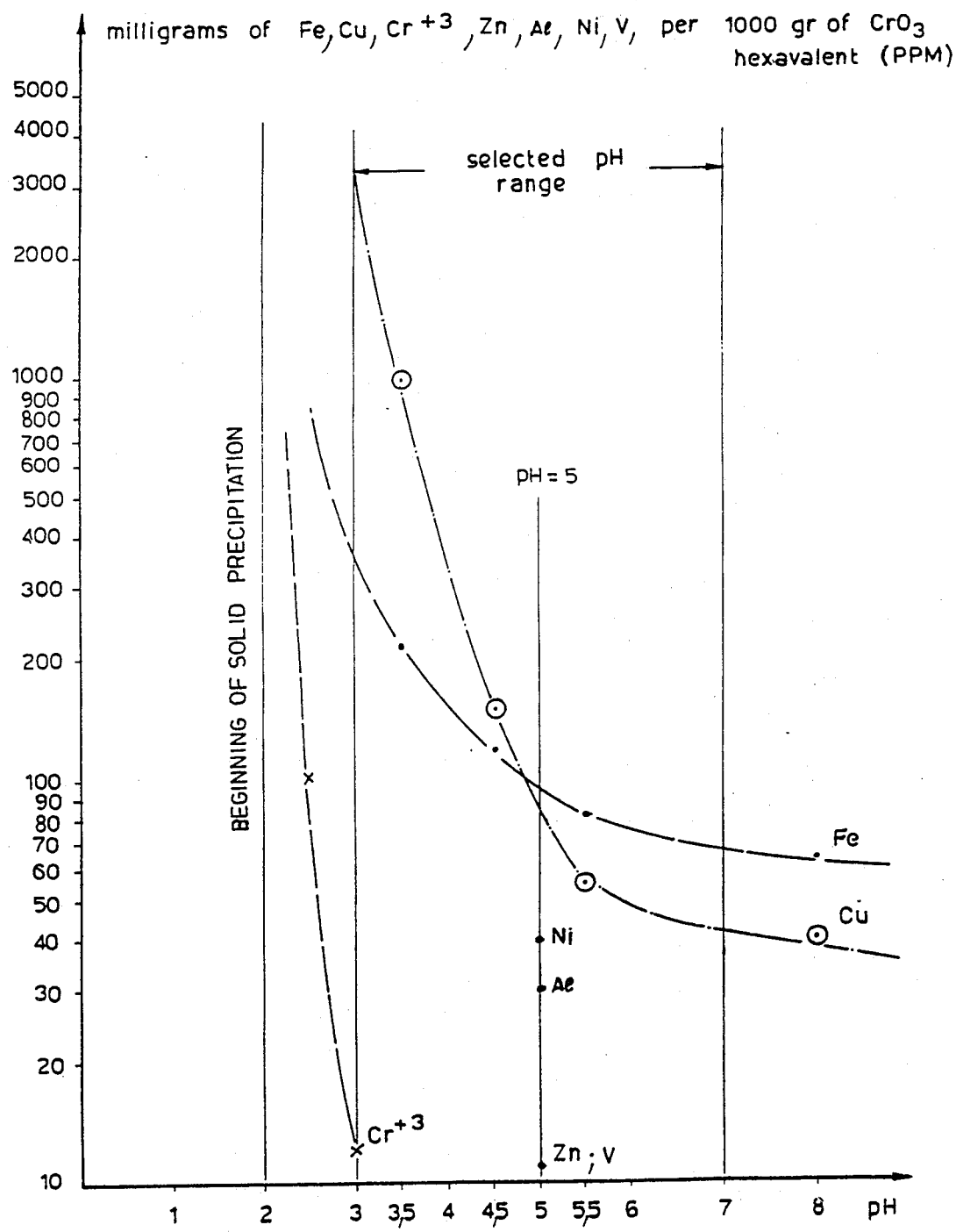
FIG. 2 graphically illustrates the separation factor pattern for iron, copper and trivalent chromium from hexavalent chromium at different pH values.

The separation factor pattern for iron, copper and trivalent chromium from hexavalent chromium was also examined at different pH values and the results are set out in FIG. 2 (in which the data are complete up to pH 5 for all elements).

In this figure it can be seen clearly that in the pH interval from 3 to 7, an interval of special importance as we shall see later, for reasons discussed further on, the separation factors are such that their values do not subsequently interfere with hide tanning operations, as emerges clearly from the examples.

At pH 3 the filtered liquids contain a solution of sodium bichromate according to completion of the reaction:

$$2HCrO_4^- \rightarrow Cr_2O_7^{-2} + H_2O \text{ (curve A in FIG. 1)}$$

At pH 7 the filtered liquids contain hexavalent chromium, 50% of which is in the form of a bichromate and 50% in the form of a monochromate according to partial occurrence of the reaction:

$$Cr_2O_7^{-2} + 2OH^- \rightarrow 2CrO_4^{-2} + H_2O \text{ (curve C in FIG. 1)}$$

By reducing the hexavalent chromium in the liquids filtered at pH 3 the following is obtained:

$$Na_2Cr_2O_7 + 3SO_2 + H_2O \rightarrow Na_2SO_4 + 2(CrOHSO_4)$$

which is the so-called Schorlemmer 33.3% basicity basic chromium sulphate, which is used in certain types of hide tanning.

By reducing the hexavalent chromium with $SO_2$ in the liquids filtered at pH 7 the following is obtained:

$$0.5\ Na_2Cr_2O_7 + Na_2CrO_4 + 3SO_2 + 1.5\ H_2O \rightarrow 1.5\ Na_2SO_4 + 2[Cr(SO_4)_{0.75}(OH)_{1.5}]$$

The latter is the so-called 50.00 Schorlemmer basicity basic chromium sulphate, which is used in certain other particular types of hide tanning.

Proceeding as described above at intermediate pH values (for example 5-6) intermediate basic chromium sulphates are obtained.

The aim of the present invention is therefore to obtain from chromium plating residual materials which, according to present laws, are classified as toxic and harmful, products of economic value, such as bichromates, chromates, chromium sulphates and derivatives thereof.

In other words, in practice the process according to the present invention on the one hand solves the ecological problem of preserving the environment from toxic substances and on the other hand offers the advantage of simultaneously exploiting what is at present a dangerous waste product.

The process described can be modified, without altering its substance, with a preliminary operation to oxidize the trivalent chromium contained in exhausted chromium plating baths to hexavalent chromium, according to known methods.

This operation reduces from about 10% to about 1% (in the case of the typical example shown for the composition of a chromium plating bath) the onus deriving from the need to dispose of solid waste, and the chromic anhydride obtained from the oxidation operation is recovered.

EXAMPLE 1

Processing of Exhausted Chromium Plating Liquids According to a known process (chromium reduction without preliminary purification)

To an exhausted liquid (10 kg), from surface chromium plating operations, having the composition indicated in the description, a 36% solution of sodium bisulphite was added, with no preliminary operation, until the hexavalent chromium had disappeared. The resulting liquid, whose physical appearance was similar to that indicated in example 2, had the following characteristics:

| | |
|---|---|
| $Cr_2O_3$ content = | 12.2% (16.0% expressed in $CrO_3$) |
| Schorlemmer basicity = | 34% |
| Fe content = | 480 mg per 100 g of liquid |
| Cu content = | 480 mg per 100 g of liquid |
| Ni content = | 1.6 mg per 100 g of liquid |
| Al content = | 16 mg per 100 g of liquid |
| Cd content = | 25 mg per 100 g of liquid |
| Zn content = | 80 mg per 100 g of liquid |
| V content = | 0.3 mg per 100 g of liquid |

This material was used for a hide tanning test, as will be described further on in example 7.

EXAMPLE 2

Processing Exhausted Liquids According to the Invention

An exhausted liquid (10 kg) from surface chromium plating operations, having the composition indicated in the description, was brought to pH 5, from an initial pH of 0.7, with a commercial sodium hydroxide solution, NaOH titre 45% (2.5 kg).

After the sodium hydroxide had been added, the temperature had risen to 70° C. The resulting mass was kept at 70° C. for 1 h, in order to aid settling of the precipitated solid, and then filtered to obtain:
a solid which, after drying at 110° C., weighed 1 kg, and a liquid with a specific gravity of 1.25 kg/l having a $CrO_3$ concentration of 22% in weight.

The CrO₃ recovered from the filtered liquid was equivalent to 75% of that contained in the exhausted liquid.

This liquid, purified and filtered, can be used for the synthesis of bichromate and monochromate. In the specific case of the present example, it was subjected to the reducing action of SO₂, which was bubbled through the liquid until the hexavalent chromium had disappeared, and a solution of basic chromium and sodium sulphate having the following characteristics was obtained:

| | |
|---|---|
| $Cr_2O_3$ content = | 13.3% (17.5% expressed in $CrO_3$) |
| Schorlemmer basicity = | 35% |
| Fe content = | 1.6 mg per 100 g of liquid |
| Cu content = | 1.5 mg per 100 g of liquid |
| Ni content = | 0.7 mg per 100 g of liquid |
| Al content = | 0.5 mg per 100 g of liquid |
| Zn, V and Cd content = | 0.1/0.2 mg per 100 g of liquid |

A hide tanning test was carried out with this material, as described in example 6.

EXAMPLE 3

Processing Exhausted Chromium Plating Liquids According to a Variant of the Invention 10 kg of an exhausted chromium plating bath, having the composition indicated in the description, were brought to pH 7 (from an initial value of 0.7) with a commercial sodium hydroxide solution, NaOH strength 45%; the amount of sodium hydroxide used was 4 kg. After the sodium hydroxide had been added the temperature had risen to 60° C. the resulting mass was kept under slow agitation for 1 h at this temperature, in order to aid settling of the precipitated solid then filtered to obtain:
a solid which, after drying at 110° C. to a constant weight, weighed 0.9 kg and
a liquid having a specific gravity of 1,4 kg/liter and a $CrO_3$ concentration of 21% in weight.

The CrO₃ separated from the liquid by filtration (compared with that contained in the exhausted liquid) was equivalent to 78%. This liquid could have been used for the synthesis of bichromate and/or monochromate, but, for closer comparison, it was subjected, as described in example 1, to the action of SO₂ until the hexavalent chromium had disappeared; a chromium sulphate and sodium sulphate solution having the following characteristics was thus obtained:

| | |
|---|---|
| $Cr_2O_3$ content = | 12.2 (16% expressed in $CrO_3$) |
| Schorlemmer basicity = | 50,5% |
| Fe content = | 1.0 mg per 100 g of liquid |
| Cu content = | 0.6 mg per 100 g of liquid |
| Ni content = | 0.3 mg per 100 g of liquid |
| Al content = | 0.2 mg per 100 g of liquid |
| Zn, V and Cd content = | 0.1/0.2 mg per 100 g of liquid |

The material thus obtained was used to carry out a hide tanning test as described in example 8.

EXAMPLE 4

Processing of exhausted liquids according to a further variant of the invention

An exhausted chromium plating bath having the following composition was used:

| | | |
|---|---|---|
| $CrO_3$ (total) = | 18.5% | (weight/weight) |
| $CrO_3$ Hexavalent = | 17.5% | (weight/weight) |
| $CrO_3$ Trivalent = | 1.0% | (weight/weight) |
| Fe = | 50 | parts per 1000 parts of total $CrO_3$ |
| Cu = | 30 | parts per 1000 parts of total $CrO_3$ |
| Zn = | 5 | parts per 1000 parts of total $CrO_3$ |
| Al = | 1 | part per 1000 parts of total $CrO_3$ |
| Ni = | 0.1 | parts per 1000 parts of total $CrO_3$ |
| V = | traces | | and the following operations were performed:

100 kg of a bath having an initial pH of 0.5 were brought to pH 4 with a sodium hydroxide solution having NaOH titer 45% (15 kg). After agitation for 1 h at 60° C. it was filtered to obtain:
15 kg of wet solid (loss at 110° C.=50%) =7.5 kg dry
100 kg of liquid having the following composition:

| | |
|---|---|
| Hexavalent $CrO_3$ = | 15% (weight/weight) |
| Trivalent $CrO_3$ = | absent |
| Fe = | 2 mg per 100 g of liquid |
| Cu = | 2 mg per 100 g of liquid |
| Zn = | 0,2 mg per 100 g of liquid |
| Al = | 1 mg per 100 g of liquid |
| Ni = | 1 mg per 100 g of liquid |
| V = | traces |

This liquid was concentrated by evaporating the water to a $CrO_3$ concentration of 50% (weight/weight) and used to obtain both directly, by crystallization, sodium bichromate ($Na_2CrO_7 \cdot 2H_2O$) and, by addition of alkalis (sodium hydrate) and subsequent crystallization, sodium monochromate ($Na_2CrO_4 \cdot 4H_2O$).

EXAMPLE 5

Processing Exhausted Liquids According to a Further Variant of the Invention

To 10 kg of an exhausted chromium plating bath, having the composition indicated in the description, sodium persulphate was preliminarily added until the trivalent chromium had disappeared. The bath was then treated as described in example 2.

A solid weighing 0.1 kg after drying at 110° C. and a liquid wholly similar in its characteristics to that in example 2 were obtained.

This liquid, thus purified and filtered, can be used for the synthesis of bichromate, monochromate and chromium sulphate, as described in all preceding examples.

The tanning operations, described in greater detail in the examples which follow, are carried out using:

A) as laboratory apparatus:
   a 70 cm diameter drum with a rotation speed of 10 rpm.

B) as tannery apparatus:
   a 2500 cm diameter drum with a rotation speed of 8 rpm.

C) as material for processing:
   light calf, kid or heavy cow skins ready for tanning pickled at pH 2,8, with a beamhouse weight of 30 kg for testing in the laboratory drum and 1500 kg for testing in the semi-industrial drum.

In all the examples that follow all percentages refer to skins ready for tanning.

EXAMPLE 6

Tanning with 35 Sch Basicity—$Cr_2O_3$ Titre 13.3—Conducted According to the Present Invention.

After a successful test carried out in a laboratory drum, tanning was repeated in a semi-industrial drum.

1500 kg of cow hides (each weighing 40-45 kg) were loaded into a drum with 100% water and 5% NaCl and after rotation for 10 minutes, 0.5% of concentrated $H_2SO_4$ was added. The drum was then kept in rotation for 30 minutes and the pH of the liquid when checked afterwards proved to be 3.6.

A further 0.25% of concentrated $H_2SO_4$ was added and, after rotation for 20 minutes, a sample of the liquid was removed and its pH proved to be 2.7, while the hide section had a pH of between 2.7 at the outside and 3 in the middle.

The liquid was drained from the drum and 90% water and 9% basic chromium sulphate solution, containing 13.3% of $Cr_2O_3$ and having 35 Schorlemmer basicity, were added (the procedure for obtaining this solution was described in example 1). After rotation for 10 minutes 1% of stuffing was added and the drum was kept rotating for 1 h.

0.5% of sodium formate was subsequently added. After rotation for 3 h the hide was checked for reaction and found to be completely crossed by the chromium. The temperature of the bath was 38° to 40° C.

Basification was then begun by adding, in three stages, $NaHCO_3$ and precisely 0.3% at each stage, and rotating the drum for 20 minutes between the first and second addition. When all the sodium bicarbonate had been added, the drum was kept in rotation; the pH was checked after 1 h and found to be 4.2.

The hides were then treated against mold so that they could be kept at length in wet blue and after the drum had been rotated for 1 h, the hides were removed and left in piles for 48 h before pressing, splitting and shaving. Treated as described, the hides showed a uniform tanning color and even gelling temperature (GT). After the hides had been stored both the split and the grain were examined again and no abnormalities were found: they had remained of a uniform colour with good softness and fullness characteristics.

EXAMPLE 7

Tanning with 34 Sch Basicity—12.2 Titre

The 8/12 kg pickled hides of 3 French calves (beamhouse weight 30 kg) were placed in a laboratory tanning container (drum) and treated with 80% water, 2.6% $Cr_2O_3$ from a solution of basic chromium sulphate, having the following characteristics:

| basicity | 34% Schorlemmer |
|---|---|
| Fe content = | 480 mg per 100 g of liquid |
| Cu content = | 480 mg per 100 g of liquid |
| Ni content = | 1.6 mg per 100 g of liquid |
| Al content = | 16 mg per 100 g of liquid |
| Zn content = | 80 mg per 100 g of liquid |
| V content = | 0.8 mg per 100 g of liquid |

After rotation for 2 h the chromium was found to have crossed the entire hide section.

Three per cent of a 10% sodium carbonate solution was then added to the bath.

Rotation was continued for 30 minutes, the a further 3% of 10% sodium carbonate solution was added and rotation was continued for 30 minutes, after which a further 4% of 10% sodium carbonate solution was added; rotation was continued for 6 h. At the end of the six hours the pH of the solution was 3.8. The hides were unloaded from the drum, piled up for 48 h and then checked for appearance before undergoing further processing. An abnormal clouring was immediately evident (dark gree. tending to brown, with patches distributed over the whole surface).

The cause was put down to the impurities contained in the liquid, particularly to the presence of iron and copper which, as is known, are harmful to tanning operations.

EXAMPLE 8

Tanning According to the Invention with 50 Schorlemmer Basicity and 12.2% $Cr_2O_3$ After deliming, soaking and pickling, 1500 kg of cow hides were placed in a semi-industrial drum with 1.8% of the pickling bath solution in order to extablish a pH of 3.5.

To this was added 7% of 12.2% $Cr_2O_3$ solution with a basicity of 50 degrees Schorlemmer taken from the exhausted chromium plating bath solution purified according to the method claimed in the present invention. The drum was kept in rotation for 30 minutes: stuffing was added in two stages and the drum was kept rotating for 2 h. A further 4% of 12.2% $Cr_2O_3$ solution with 50° Schorlemmer basicity (from recovery of chromium plating baths) was added and, after checking the pH of the bath, which proved to be 3.8, the hides were removed and left piled up for 48 h.

The technital data confirmed a positive tanning result, with a good colour, regular penetration speed, absence of patches after 10 days of wet storage, even grain. The hides were subsequently pressed, split and shaved to 1.2 mm, then neutralizing, dying and stuffing was carried out.

The hides, subsequently pressed, were dried and perched. A good uniform colour, the same degree of fullness and softness in all skins and good blowing strength were found.

We claim:

1. A process for recovering chromic anhydride from exhausted chromium plating baths polluted by metal compounds, comprising the steps of:
    a) adding an alkali to the exhausted solution to adjust it to a pH range between 3 and 7;
    b) precipitating the metallic pollutants; and
    c) separating the precipitate obtained in step b) from the solution containing hexavalent chromium by filtration, wherein the chromium of said solution are partially oxidized from the trivalent to the hexavalent state and said metallic pollutants are coprecipitated together with chromium chromate.

2. The process of claim 1, wherein said coprecipitation is carried out at a pH within the range from 5 to 6.

3. The process of claim 1, wherein the filtered solution containing hexavalent chromium is subjected to the action of a reducer.

4. The process of claim 3, wherein the reducer is sulfur dioxide which produces a solution of basic chromium sulfate and sodium sulfate to be used as a hide tanning bath.

5. The process of claim 1, wherein the alkali is commercial sodium hydroxide.

6. The process of claim 1, wherein the filtered solution containing hexavalent chromium is then used without further purification as a basic material for the synthesis of hexavalent chromium salts.

* * * * *